United States Patent [19]

Naylor

[11] Patent Number: 5,678,204
[45] Date of Patent: Oct. 14, 1997

[54] PROTECTIVE COVER FOR AN ELECTRONIC DEVICE

[76] Inventor: Richard C. Naylor, 48 Lincoln St., Abington, Mass. 02351

[21] Appl. No.: 276,031

[22] Filed: Jul. 14, 1994

[51] Int. Cl.⁶ .............................. A45F 5/00; B65D 85/38
[52] U.S. Cl. .................. 455/90; 455/128; 455/351; 379/451; 206/305
[58] Field of Search ................ 455/90, 95, 128, 455/347, 351, 352; 379/433, 440, 451; 206/305, 320; 361/814; 312/7.1, 206, 223.1, 326, 328; 49/463

[56] References Cited

U.S. PATENT DOCUMENTS

| | | | |
|---|---|---|---|
| 3,391,256 | 7/1968 | Nawman | 379/451 |
| 4,071,065 | 1/1978 | Halbich | 206/305 |
| 4,259,568 | 3/1981 | Dynesen | 206/305 |
| 4,325,142 | 4/1982 | Nakazawa | 455/351 |
| 4,424,899 | 1/1984 | Rosenberg | 206/305 |
| 4,574,285 | 3/1986 | Bascou | 455/128 |
| 4,771,927 | 9/1988 | Ventura | 455/90 |
| 4,775,083 | 10/1988 | Burger et al. | 455/351 |
| 4,793,480 | 12/1988 | Gelardi et al. | 206/308.1 |
| 4,803,473 | 2/1989 | Taylor | 455/90 |
| 5,038,400 | 8/1991 | Baracat et al. | 455/90 |
| 5,092,459 | 3/1992 | Uljanic et al. | 206/305 |
| 5,168,991 | 12/1992 | Whitehead et al. | 206/308.1 |
| 5,316,141 | 5/1994 | Jalomo | 206/320 |
| 5,369,788 | 11/1994 | Nagai | 455/90 |
| 5,383,091 | 1/1995 | Snell | 379/451 |
| 5,388,691 | 2/1995 | White | 206/305 |
| 5,433,319 | 7/1995 | Tang | 206/308.1 |

OTHER PUBLICATIONS

Conventional Compact Disc Jewel Case Holder.

*Primary Examiner*—Reinhard J. Eisenzopf
*Assistant Examiner*—Lester G. Kincaid
*Attorney, Agent, or Firm*—Steven N. Fox, Esq.

[57] ABSTRACT

This is a cover for a transmitter which engages the sides of the transmitter and covers the actuation buttons of the transmitter when the device is carried in a pants pocket preventing accidental activation of the buttons; a plastic variation has a cover portion which can be moved to permit access to the buttons.

3 Claims, 5 Drawing Sheets

PROTECTIVE COVER FOR AN ELECTRONIC DEVICE

BACKGROUND OF THE INVENTION

This invention relates to a cover for an electronic device.

SUMMARY OF THE INVENTION

The invention comprising a cover for a transmitter having a top and two sides. Each of the two sides being in spaced relation to each other, extending from the top and each of them being arced and flexible. A variation of the cover is of box like configuration having a movable cover portion.

BRIEF DESCRIPTION OF THE DRAWINGS

Further details are explained below with the help of the example(s) illustrated in the attached drawings in which.

DESCRIPTION OF THE PREFERRED EMBODIMENT(S)

Figure 1:
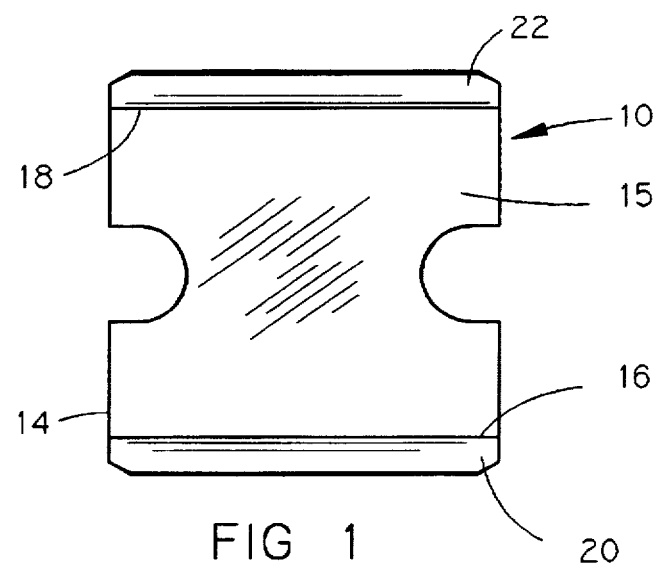
FIG. 1 is a top plan view of the cover for a transmitter according to the present invention.
Figure 2:
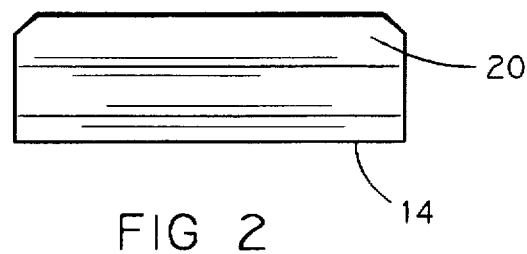
FIG. 2 is a side elevational view of the cover for a transmitter shown in FIG. 1.
Figure 3:
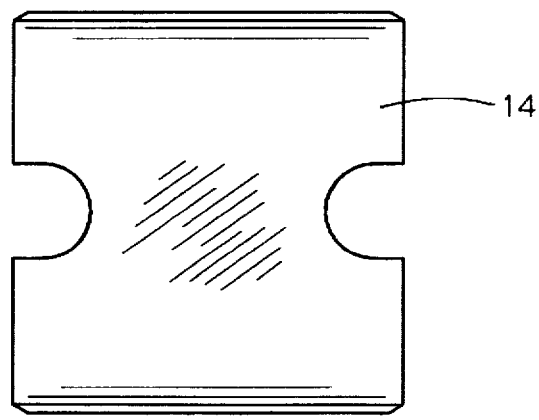
FIG. 3 is a bottom plan view of the cover for a transmitter shown in FIG. 1.
Figure 4:
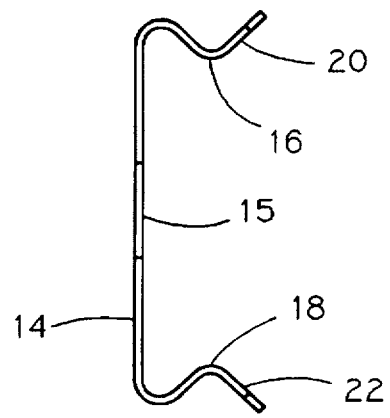
FIG. 4 is an end elevational view of the cover for a transmitter shown in FIG. 1.
Figure 5:
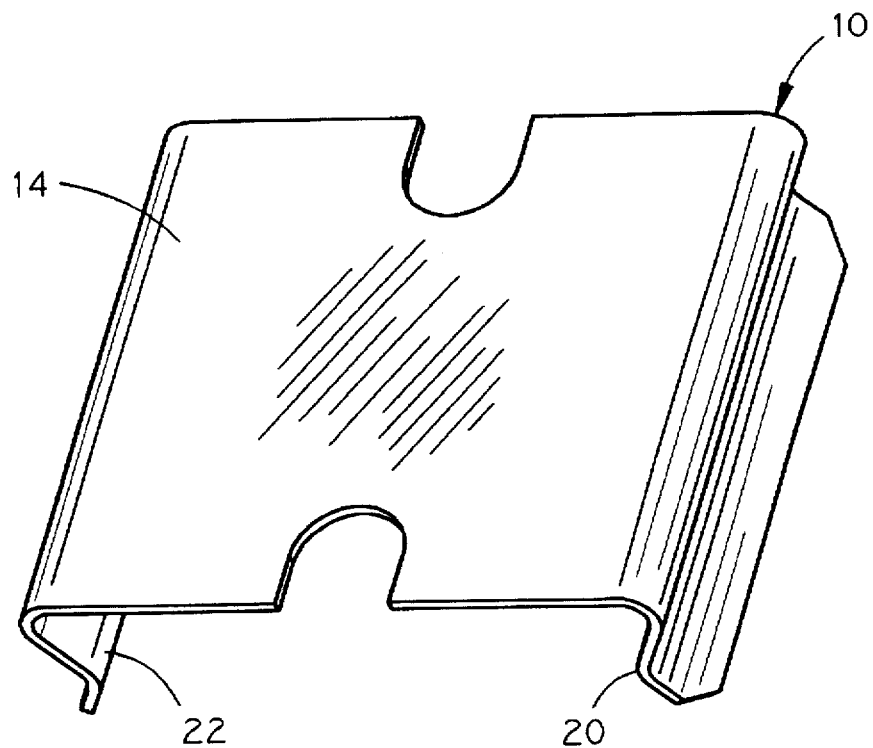
FIG. 5 is an enlarged perspective view of the cover for a transmitter shown in FIG. 1.
Figure 6:
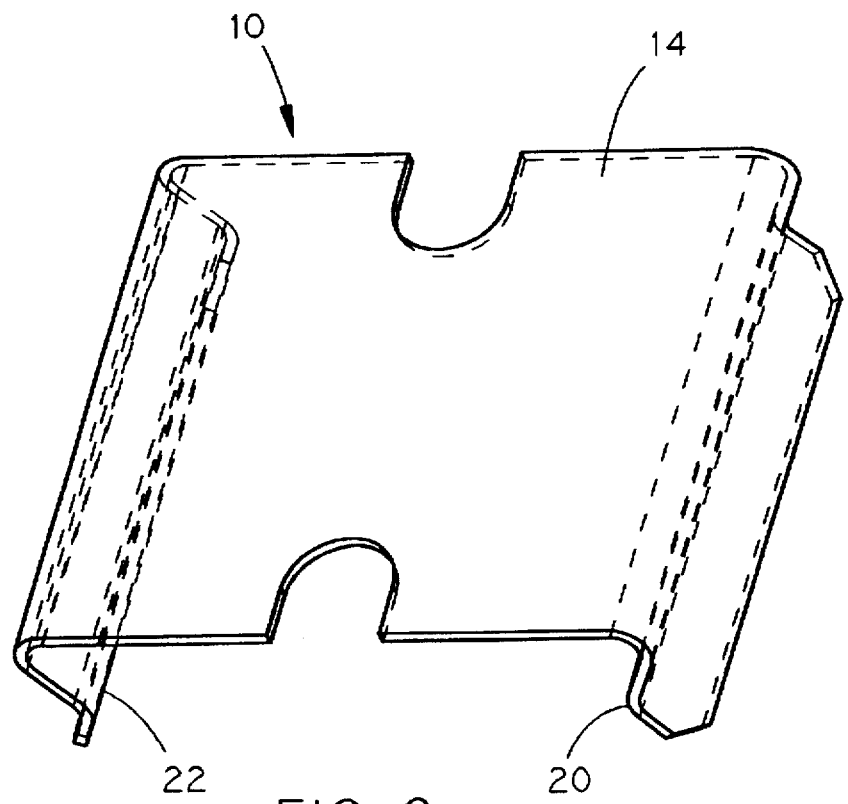
FIG. 6 is an enlarged perspective view of the cover for a transmitter shown in FIG. 1 showing the inner contours in phantom.

There is shown in the drawings a cover 10 for a transmitter 12. The cover 10 comprising a rectangular base portion 14 which has, an inner surface 15, a first long edge 16 and a second long edge 18 on the opposite side from the first long edge 16 and in spaced parallel relation therewith. A flexible, first side 20 extends from the first long edge 16 having a height equal to or slightly less than the thickness of the transmitter 12. A flexible second side 22 extends from the second long edge 18 having a height equal to or slightly less than the thickness of the transmitter 12. The distance between the first and second sides 20, 22 is equal to or slightly less than the width of the transmitter 12. The first and second sides 20, 22 are in right angle relation to the base portion and are slightly arced.

The transmitter 12 includes a front face 24, having a series of actuator buttons 26 mounted thereon, a primary side 24a and a secondary side 24b.

The transmitter 12 is frequently carried around sometimes causing accidentally activation of one of the actuator buttons 26. To prevent this from happening the cover 10 is engaged with the transmitter 12 with inner surface 15 of the base portion 14 in abutting, superposed relationship. The first and second sides 20, 22 engage the primary and secondary sides 24a, 24b. This engagement requires that the first and second sides 20, 22 are flexed slightly outwardly (i.e. away from the transmitter 12) maintaining the sides 20, 22 under some tension. This engagement holds the cover 12 securely to the transmitter 12.

Figure 7:
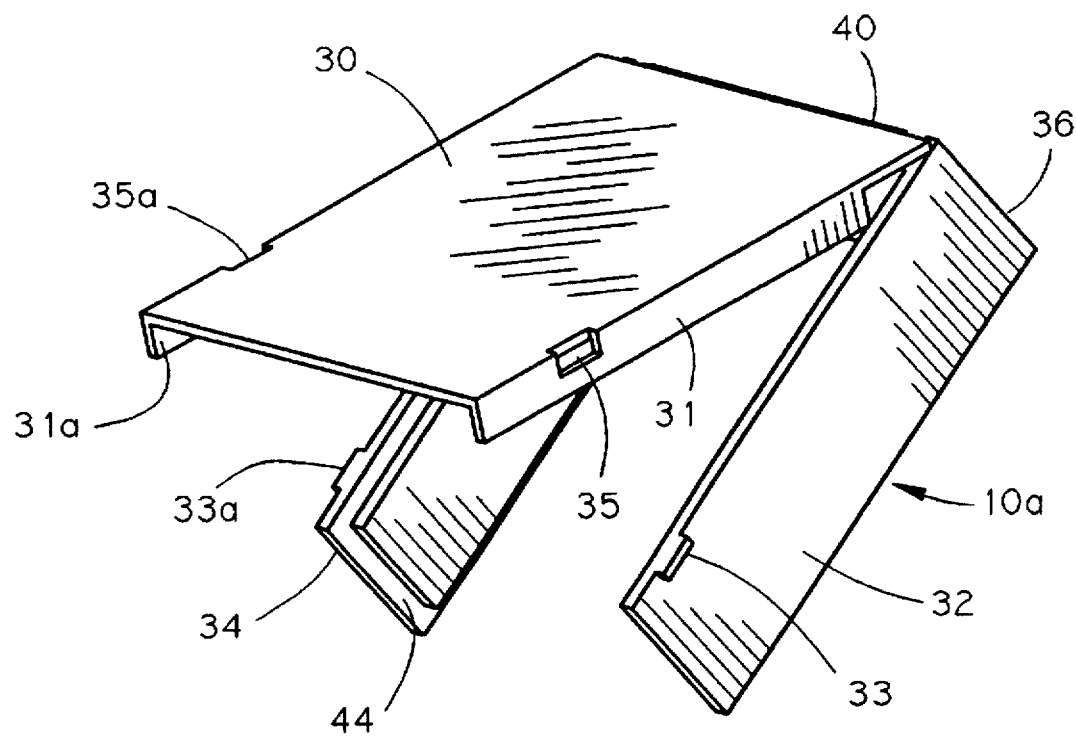
FIG. 7 is an enlarged perspective view of a variation of the cover for a transmitter shown in FIG. 1.
Figure 13:
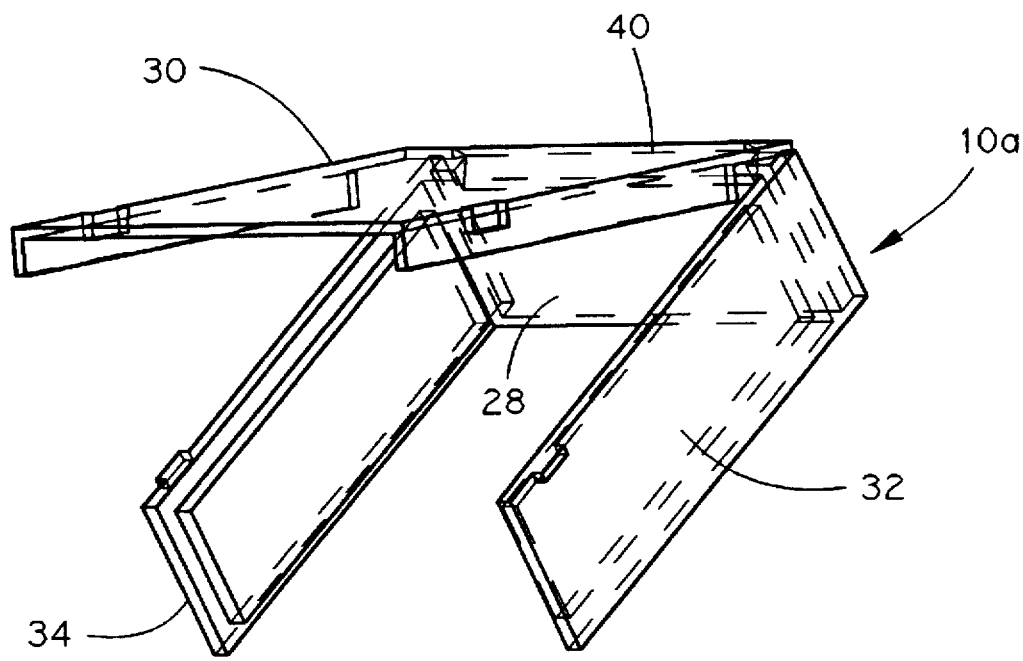
FIG. 13 is perspective view of the cover for a transmitter shown in FIG. 7 showing the inner contours in phantom.
Figure 8:
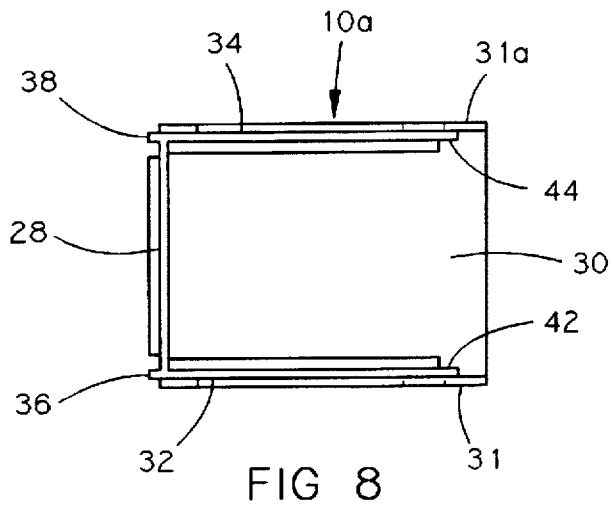
FIG. 8 is a bottom plan view of the variation of the cover for a transmitter shown in FIG. 7.
Figure 9:
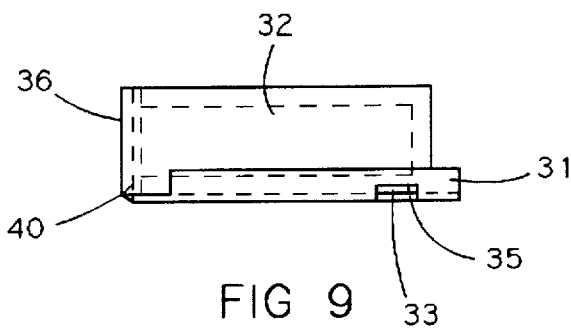
FIG. 9 is a side elevational view of the variation of the cover for a transmitter shown in FIG. 7.
Figures 10, 11, 12:
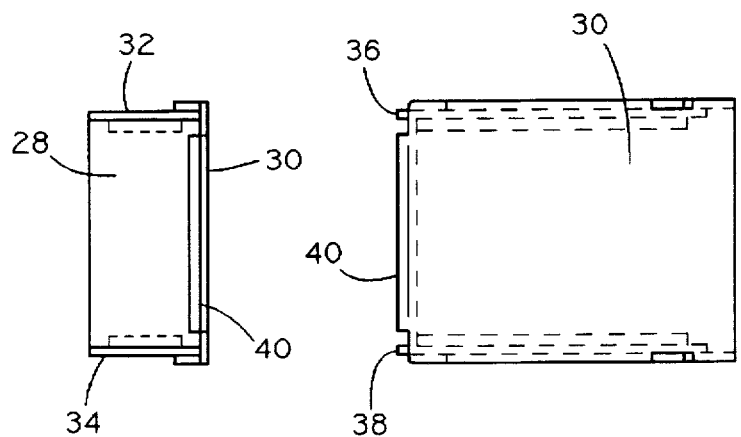
FIG. 10 is an end elevational view of the variation of the cover for a transmitter shown in FIG. 7.
FIG. 11 is a top plan view of the variation of the cover for a transmitter shown in FIG. 7.
FIG. 12 is an end elevational view of the variation of the cover for a transmitter shown from the opposite end of FIG. 10.
Figure 16:
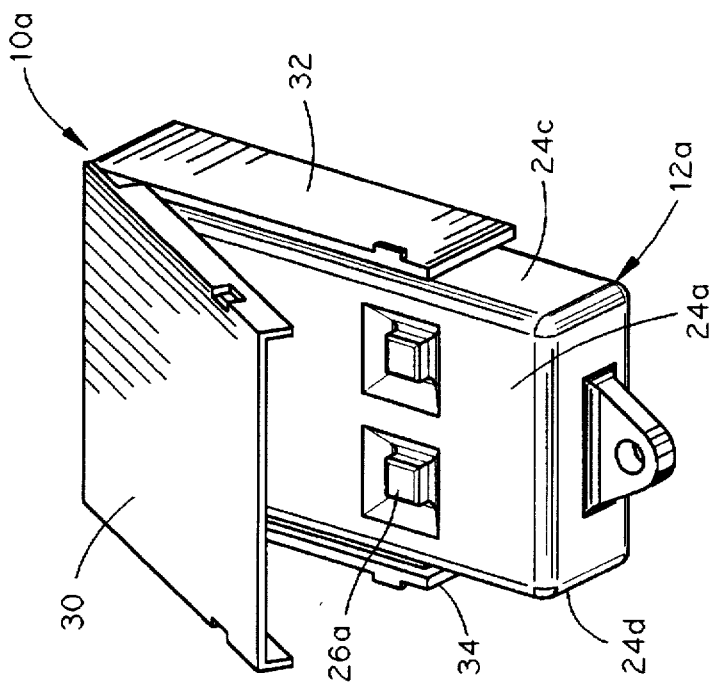
FIG. 16 is perspective view of the cover for a transmitter shown in FIG. 7 engaged to a transmitter.
Figure 15:
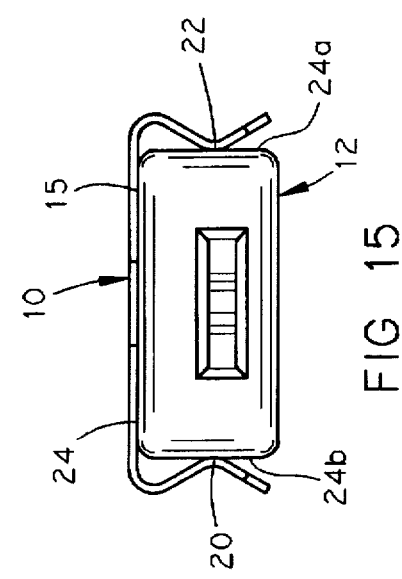
FIG. 15 is an end elevational view showing the cover for a transmitter shown in FIG. 1 engaged to a transmitter.
Figure 14:
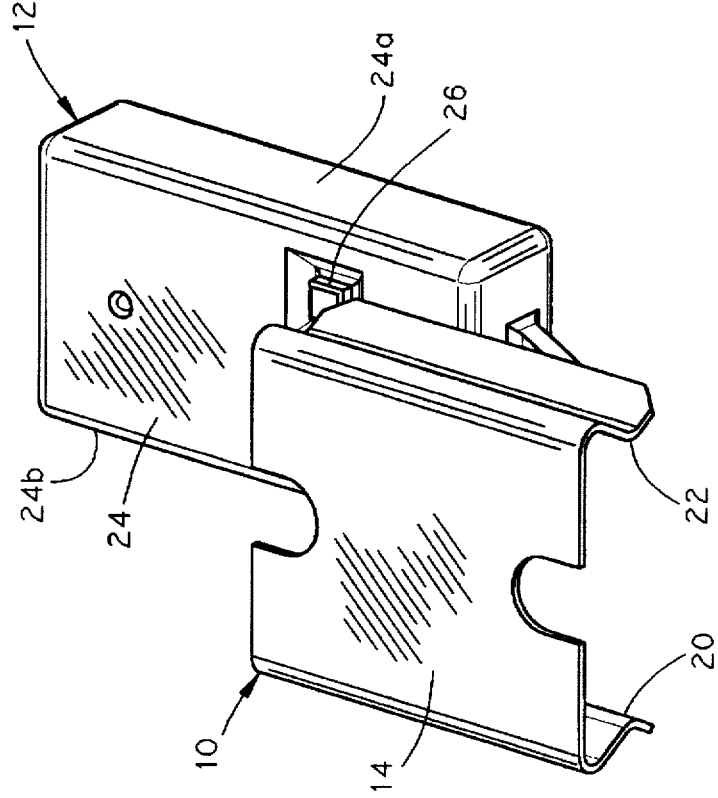
FIG. 14 is perspective view of a transmitter and the cover for a transmitter shown in FIG. 1.

A variation 12a of the cover 12 is shown in FIGS. 7–13 and 16. The variation 12a comprises a rear wall portion 28, a top cover portion 30, a first side wall portion 32, and a second side wall portion 34. The rear wall portion 28 has a first short side edge 36 at one end, a second short side edge 38 at the other end and an upper edge 40. The first and second short side edges 36, 38 are in spaced parallel relation to each other with the upper edge 40 in right angle relation to the first and second short side edges 36, 38. The first side wall portion 32 extends in right angle relation from the first short side edge 36 of the rear wall portion 28. The second side wall portion 34 extends in right angle relation from the second short side edge 38 of the rear wall portion 28. The first and second side wall portions 32, 34 are in spaced parallel relationship and each on terminates in a free terminal end. The first side wall portion 32 has a finger 33 extending from the top edge proximate its free end and the second side wall portion 34 has a finger 33a extending from the top edge proximate its free end. The top cover portion 30 has a first panel 31 extending from one edge of its edges and a second panel 31a extending from the other of its edges as shown in FIG. 7. Each of the inner surfaces of the first and second panels includes a rectangular apertures 35, 35a which are engaged by the fingers 33, 33a when the top cover portion 30 as indicated in FIG. 7 and shown in FIG. 9. The top cover portion 30 is hingedly connected to a rear wall portion 28 at the upper edge 40. The top cover portion 30 is movable in relation to the rear wall portion 40 and can be moved into engagement with the first and second side wall portions 32, 34. The first side wall portion 32 has a first inner surface 42 and the second side wall portion has a second inner surface 44. The first inner surface 42 and the second inner surface 44 have fastener means such as VELCO associated therewith.

The transmitter 12a is similar to the transmitter 12, having the same problem of accidental actuation, including a front face 24a, having a series of actuator buttons 26a mounted thereon, a primary side 24c and a secondary side 24d. The primary side 24c and the secondary side 24d have fastener means such as VELCO associated therewith.

The distance between the first and second side wall portions 32, 34 is equal to or slightly less than the width of the transmitter 12a. To engage the cover 10a to the transmitter 12a, the rear wall portion of the cover 10a is abutted against the outer surface of the rear wall of the transmitter 12b. This positions the first inner surface 42 against the primary side 24c of the cover 10a and the first secondary side 24d against secondary side 24d of the cover 10a; this also places the VELCO surfaces against each other causing the cover 10a to adhere to the transmitter 12b.

What is claimed is:

1. A device for supporting and covering a transmitter carried and used by an operator, the transmitter having first and second side portions substantially parallel to each other and a top portion having at least one actuator button accessible therefrom, the device comprises: a rear portion comprising a top portion, and first and second side portions, each of said first and second side portions extending in substantial right angle relation from said rear portion, said top portion being moveably engaged with said rear portion, said first and second side portions each having an inner surface facing each other, first means for removably securing said top portion to said first and second side portions, second means for removably securing the first and second side portions of the transmitter with said inner surfaces of said first and second side portions, respectively, to prevent movement of the transmitter within the device, whereby when the operator desires to depress the actuator button, the operator may move said top portion to obtain access to the actuator button and when the transmitter is not in use the operator may secure said top portion of the device to said first and second side portions of the device to prevent the inadvertent depression of the actuator button.

2. The device of claim 1, wherein said second means for removably securing comprises a velcro tape disposed upon said inner surface of said first and second side portions.

3. The device of claim 1, wherein said first means for removably securing comprises a finger member extending from each of said first and second side portions and first and second apertures disposed in said top portion, said finger members being removably engageble with said first and second aperatures, respectively.

* * * * *